US008319467B2

United States Patent
Kos et al.

(10) Patent No.: US 8,319,467 B2
(45) Date of Patent: Nov. 27, 2012

(54) MANIPULATOR WITH AN EXTERNAL ROTOR MOTOR

(75) Inventors: Daniel Kos, Rehling (DE); Andreas Weingaertner, Karlsbad (DE); Gernot Nitz, Augsburg (DE)

(73) Assignee: Kuka Roboter GmbH, Augsburg (DE)

( * ) Notice: Subject to any disclaimer, the term of this patent is extended or adjusted under 35 U.S.C. 154(b) by 492 days.

(21) Appl. No.: 12/691,346

(22) Filed: Jan. 21, 2010

(65) Prior Publication Data
US 2010/0180708 A1 Jul. 22, 2010

(30) Foreign Application Priority Data

Jan. 21, 2009 (DE) .................. 10 2009 005 496

(51) Int. Cl.
*G05B 19/19* (2006.01)

(52) U.S. Cl. .............. 318/568.11; 318/568.16; 318/652; 318/675

(58) Field of Classification Search ............. 318/568.11, 318/568.16, 625, 652, 675; 607/2, 8, 11, 607/14, 15, 19, 23, 25; 414/1, 2, 5, 7, 729
See application file for complete search history.

(56) References Cited

U.S. PATENT DOCUMENTS

| 2,591,967 | A | | 4/1952 | Ridgely et al. |
| 4,602,195 | A | * | 7/1986 | Eberle et al. ............. 318/568.11 |
| 4,925,312 | A | * | 5/1990 | Onaga et al. .................. 700/261 |
| 5,144,211 | A | * | 9/1992 | Daggett et al. ........... 318/568.11 |
| 6,778,867 | B1 | * | 8/2004 | Ziegler et al. .................... 700/79 |
| 7,262,574 | B2 | * | 8/2007 | Koyanagi et al. ........ 318/568.16 |
| 2003/0220169 | A1 | | 11/2003 | Norman |

FOREIGN PATENT DOCUMENTS

| JP | 09098450 | 4/1997 |
| WO | WO 01/99254 | 12/2001 |

* cited by examiner

*Primary Examiner* — Walter Benson
*Assistant Examiner* — Thai Dinh
(74) *Attorney, Agent, or Firm* — Schiff Hardin LLP

(57) ABSTRACT

A manipulator, in particular a small robot, has at least two motor mutually movable limbs with a motion axis of both limbs being acted on by an axle drive that has an external rotor motor, a position transmitter and a transmission. The transmission has at least one planetary gear set with a center gear and at least one planet meshing with it that also meshes with a ring gear and is mounted on a planet carrier. One of both limbs of the manipulators is torque proof connected with the ring gear and is mounted by this radial and/or axially, and the other is torque proof connected by both limbs of the manipulator with the planet carrier and is mounted by this radial and/or axially.

14 Claims, 1 Drawing Sheet

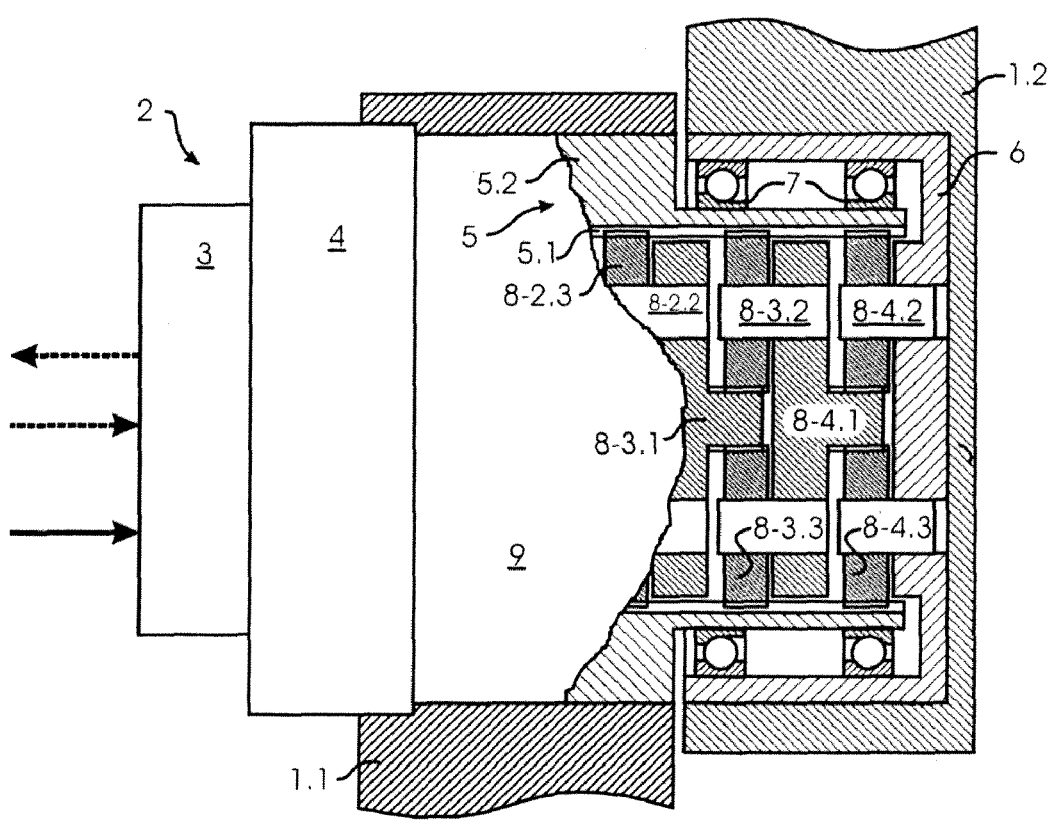

MANIPULATOR WITH AN EXTERNAL ROTOR MOTOR

BACKGROUND OF THE INVENTION

1. Field of the Invention

The present invention concerns a manipulator, in particular a small robot, of the type having at least two limbs movable against one another by motor, and an axle drive which is acting on one motion axis of both limbs and that has an external rotor motor, a position transmitter and a transmission.

2. Description of the Prior Art

Manipulators in general have several limbs that are mutually movable in pairs, and that are connected in joints with each other to form the motion axes of the manipulator. Thus a typical six-axle articulated robot has a base, a carousel pivotable on the base around a vertical axis of rotation, a lever movable on the carousel around a horizontal axis of rotation, and an arm-hand-unit pivotably connected to the lever with an axis of rotation parallel thereto, composed of three axes of rotation perpendicular in pairs.

For mutual movement of the single limbs relative to each other, axle drives act on the respective single motion axes. Each such drive generally includes an electric motor, a position transmitter for the regulation of the driving mechanism, and a transmission for reduction of the output speed of the electric motor to the speed of the motion axis.

From DE 100 30 129 A1 a lightweight robot is known with an external rotor motor, a Hall-sensor as a position transmitter and a harmonic-drive-gear with a wave-generator is connected with the rotor of the electric motor, to reduce weight and dimensions. The robot limbs are supported mutually independently of the axle drive in order to maintain the robot kinematics also with a dismantled axle drive.

Disadvantageously such harmonic-drive gears are technically complicated small batch items, therefore preventing their use in small, light and non-expensive manipulators, for example, for schools and universities, as does the separate mounting of the robot limbs mutually against each other and the overall size resulting therefrom which is common in today's robots.

SUMMARY OF THE INVENTION

An object of the present invention is to provide an improved manipulator that avoids these problems.

A manipulator according to the invention has two or more limbs which are connected in pairs within joints and are movable with respect to each other by a motor. The manipulator may be a small robot in particular, to be used for teaching purposes for example, preferably, based on a kinematical root, at least six such limbs are provided to achieve all spatial degrees of freedom.

Axle drives act on the motion axles of the joints, with one or multiple or preferably all axle drives each having an external rotor motor, a position transmitter and a transmission with at least one planetary gear set with a center gear and one or several planets meshing with it. The planetary gears mesh with a ring gear and rotate on a planet carrier. One of the two of limbs of the manipulator connected in a pair by the respective joint, preferably the one kinematically closer to the root (a carousel or a lever for example), is torque proof connected with the ring gear and is supported radially and/or axially by the ring gear. The other of the both limbs of the manipulator, preferably the one kinematically more distant to the root and therefore closer to the working point or TCP (a lever or an arm for example) is torque proof connected with the planet carrier and is supported radially and/or axially by the planet carrier.

The manipulator limbs are mounted by the ring gear or the planet carrier of the transmission, in particular on the ring gear or the planet carrier of the transmission. Due to this mounting, additional separate mountings of the manipulator limbs with respect to each other, a separate output shaft of the transmission and its mounting can be avoided, advantageously. In order to be mounted and to be connected torque proof, manipulator limbs can be connected with the respective elements of the planetary gear set. The manipulator limbs can be connected to the ring gear or planet carrier for example, can be connected detachably, by form-fit and/or by force-fit for example, by screw connections for example, push-fit fittings or the like. Equally, manipulator limbs can be connected with elements of the planetary gear set also in a non-detachable manner, for example by welding, soldering or bonding, or can be formed integrally with them.

For the most part, standard components can be used in a preferred embodiment due to the use of a single-stage or multi-stage planetary gear. This is possible in an advantageous embodiment in particular, if two or more planetary gear sets comprise components of identical construction, for example, planet gears, planet spiders, planet carriers and/or center gears. Besides, a planetary gear has rather small dimensions axially and radially. So, a compact axle drive becomes available, advantageously. A further reduction of weight and construction space may be achieved advantageously by supporting the manipulator limbs directly by the respective elements of the planetary gear set itself. Preferably, the backlash of the transmission can be also reduced by the planetary gear.

In a preferred implementation, the planet carrier is designed as one- or multi-part output shaft, shaped like a pot, with a shell surface and is pivoted on the ring gear. Preferably, one front side of the planet carrier is basically open and one front side is basically closed. Preferably, a component, which comprises an internal gearing with which the planets of the planetary gear set are meshing, is designated as ring gear. This component can be formed with one or multiple parts. In particular, it can be formed as a hollow shaft with internal gearing and besides, a supporting ring for the mounting of one manipulator limb for example and/or a rotary rotor bell of the external rotor motor. The hollow shaft with internal gearing can be formed detachably or non-detachably with the supporting ring and/or the rotor bell, in particular formed integrally therewith.

In a preferred embodiment, one or several anti-friction bearings, in particular thin ring ball bearings, are arranged between the planet carrier and the ring gear to radially mount one manipulator limb at the other. Two bearings can be arranged in X-assembly or O-assembly to achieve in particular a high resistance against tilting. In a preferred embodiment, an axial mounting of one manipulator limb at the other can be achieved by at least one fixed bearing.

Preferably, the output shaft, which is shaped like a pot, overlaps the transmission, in particular its planetary gear sets, preferably essentially at half of its length. Thereby, the manipulator limb connected to the output shaft, which is shaped like a pot, can be mounted in a space-saving and stiff manner, simultaneously. Additionally or alternatively, a supporting ring, located radially outside of the ring gear, can overlap the transmission, in particular its planetary gear set, preferably essentially at half of its length. This serves to mount the manipulator limb, which is connected to the ring gear, with the supporting ring in particular, in a space-saving and stiff manner, simultaneously. If, in a preferred combination of both features, both the output shaft, which is shaped like a pot, and the supporting ring each overlap half of the transmission, the transmission can be protected. At the same time, a minimum axial installation space is achieved. The ratio of axially overlapped lengths may vary. For instance, when a thinner manipulator limb is arranged at the side of the output shaft, the output shaft, which is shaped like a pot, may be formed narrower and may overlap less of the transmission, respectively.

To achieve significant speed reductions in particular, the transmission of a preferred embodiment comprises two or more planetary gear sets. In an advantageous embodiment, the planets of at least two planetary gear sets preferably of all planetary gear sets, mesh with a common ring gear to save space.

In particular to replace a separate output shaft of the external rotor motor, a stator, which is surrounded by a rotary rotor bell of the external rotor motor, can be connected torque proof with a center gear of a planetary gear set detachably or non-detachably, in particular integrally formed therewith.

To achieve a high power density and a high service life, the external rotor motor is electronically commutated, preferably. In particular, such an electronically commutated external rotor motor can be formed as a flat or pancake motor, preferably as a disk motor, to realize a compact axle drive.

If, in a preferred embodiment, the position transmitter is arranged on a front side of the external rotor motor opposite to the transmission, it is well accessible for signal lines to a manipulator controller, advantageously. At the same time, a flange of the position transmitter may at least partially surround the external rotor motor from this front side and thus encase it against environmental factors. The position transmitter can comprise, for example, an incremental rotary position transducer and/or a Hall-sensor wherein also a speed or acceleration sensor represents a position transmitter for the purposes of the present invention, because by integration the joint position or the change of the joint position of the motion axis is determinable. At the same time, the position transmitter can serve for the regulation of the manipulators and for the electronic commutating, advantageously.

BRIEF DESCRIPTION OF THE DRAWINGS

The single FIGURE shows an axle drive of a manipulator according to an embodiment of the present invention.

DESCRIPTION OF THE PREFERRED EMBODIMENTS

The FIGURE shows in a partial section along its motion axis an axle drive 2 of a small robot according to an embodiment of the present invention. The axle drive 2 moves a lever 1.2 of the six-axle small robot (which apart from that is not shown) against its carousel 1.1 to realize the first horizontal axis of rotation. The kinematics of the small robot include the preceding first vertical axis of rotation of the carousel 1.1 on a basic rack and the connecting second horizontal axis of rotation of a central hand on the lever 1.2 in which three further axes of rotation, perpendicular in pairs, are arranged. In particular the axle drive of the second horizontal axis of rotation between lever and central hand can be achieved in the same manner like the axle drive 2 explained in the following.

The axle drive 2 comprises a (in FIG. 1 not cut) external rotor motor 4. For its electronic commutation and for the control of the robot, there is arranged a position transmitter 3 on the front side which is not facing the lever 1.2 of the motor 4 (left in FIG. 1), so that signal connections (represented by dashed arrows in FIG. 1) with a (not displayed) robot controller as well as an electric power supply (represented by a continuous arrow in FIG. 1) of the motor 4, which are opposite to the front side of motor 2, are not affected by the lever 1.2. The position transmitter 3 can include, for example, an incremental rotary position transducer and/or a Hall sensor. A flange of its housing encases a front side and the outside perimeter of the external rotor motor 4.

On the opposite front side to the position transmitter 3 there is arranged a planetary gear 9 with four stages to reduce the output speed of the external rotor motor 4 to the rotating speed of the lever 1.2 against the carousel 1.1. It comprises four planetary gear sets arranged in cascades, which preferably correspond structurally to each other, wherein the rear sets which can be seen in the partial cut of FIG. 1 are distinguished by the indexes "−2", "−3" or "−4" respectively.

The fourth set "−4", which is on the side of the output shaft, comprises four planets 8-4.3 which are mounted on planet spiders 8-4.2 of a planet carrier 6 and mesh with a center gear 8-4.1 and an internal gearing 5.1 of a ring gear 5. The center gear 8-4.1 forms at the same time the planet carrier for the preceding third planetary gear set. Moreover their four planets 8-3.3 are pivotably mounted on planet spiders 8-3.2 of the center gear 8-4.1. They mesh with the same internal gearing 5.1 of the ring gear 5 and a center gear 8-3.1 which in turn forms the planet carrier for the preceding second planetary gear set in analogous manner and for this purpose supports on the planet spiders 8-2.2 their four planets 8-2.3 which mesh with the gearing of the center gear, which is directly cut into the planet carrier of the first planetary gear set. The four planets which are mounted on this planet carrier of the first planetary gear set (which is not shown in the partial cut of FIG. 4) mesh with the same internal gearing 5.1 of the ring gear 5 and with a center gear which is directly cut into the stator of the external rotor motor 1. Preferably, the four planetary gear sets are structurally the same. In particular all sets comprise the same planets and planet spiders and the first to third set comprise the same planet carriers. This reduces the price of production of the transmission. Nevertheless, in particular for the realization of other transmission reduction ratios, alternatively also different planetary gear sets with different radii and cog figures are possible.

Integral with the hollow shaft which carries the internal gearing 5.1, there is arranged a radial outside supporting ring 5.2, which forms the multi part ring gear 5 together with the hollow shaft and a rotor bell of the external rotor motor 4 which is fixed, for example by screwing or welding, to said supporting ring. The supporting ring 5.2 overlaps the transmission 9 essentially on its half axial length (from the left to the right in FIG. 1). The carousel 1.1 receives the supporting ring 5.2 in a through-hole and is toque proof connected with it, for example, by a press fit, a screw connection or by welding, so that it is mounted axially and radial by the supporting ring 5.2.

The planet carrier 6 of the fourth set is arranged as an output shaft with the shape of a pot or a bell and is mounted pivotably by means of thin ring ball bearings 7 which are adjusted against each other and are arranged in O-assembly on the ring gear 5. It overlaps the transmission 9 essentially on half of its axial length (from the right to the left in FIG. 1). Therefore the planetary gear is very compact and protected. The lever 1.2 receives the output shaft 6 which is shaped like a pot in a cavity by form-fit and is connected with it in a torque proof manner, for example, by a press fit, a screw connection or by welding, so that it is mounted by the output shaft 6 which is shaped like a pot axially and radial.

Therefore the present inventions provides an axle drive which in particular due to the arrangement of the last planet carrier as an output head is very compact, due to the encapsulation of motor 4 and transmission 9 by the flange of the position transmitter 3 or supporting ring 5.2 respectively and output shaft 6 which is shaped like a pot is robust, and due to the use of the same components in the different planetary gear sets can be produced at a reasonable price. By the mounting of both manipulator limbs 1.1, 1.2 directly on the supporting ring 5.2 or on the output shaft 6 which is shaped like a pot, additional separate mountings can be avoided and a slender contouring in axial direction of the joint with low system weight can be realized. The thin ring ball bearings 7 allow a mounting with high resistance against tilting of the output shaft 6 with the shape of a pot on the ring gear 5 and thus of the lever 1.2 by the carousel 1.1.

Although modifications and changes may be suggested by those skilled in the art, it is the intention of the inventors to embody within the patent warranted hereon all changes and modifications as reasonably and properly come within the scope of their contribution to the art.

We claim as our invention:

1. A robotic manipulator comprising:
   at least two limbs connected to each other at a motion axis allowing relative movement of each of said two limbs with respect to each other;
   an axle drive in mechanical connection with said motion axis that operates on said motion axis to move said limbs relative to each other, said axle drive comprising a rotor motor, a position transmitter and a transmission; and
   said transmission comprising at least one planetary gear set comprising a center gear and at least one planet gear that meshes with said center gear, and a ring gear, said at least one planet gear being mounted on a planet gear carrier, one of said two limbs being connected to said ring gear with torque-proof connection and being mounted by said ring gear in a ring gear mounting arrangement selected from the group consisting of radial mounting and axial mounting, and the other of said limbs being connected to said planet gear with a torque-proof connection and being mounted by said planet carrier in a planet gear carrier mounting arrangement selected from the group consisting of radial mounting and axial mounting.

2. A robotic manipulator as claimed in claim 1 wherein said planet gear carrier forms an output shaft having a pot-shape and being pivotably mounted in said ring gear.

3. A robotic manipulator as claimed in claim 2 wherein said output shaft overlaps said transmission by approximately half of a length of said output shaft.

4. A robotic manipulator as claimed in claim 1 comprising a rolling contact bearing between said planet gear carrier and said ring gear.

5. A robotic manipulator as claimed in claim 4 wherein said rolling contact bearing is a ring ball bearing.

6. A robotic manipulator as claimed in claim 1 wherein said planetary gear set is a first planetary gear set, and wherein said transmission comprises at least one further planetary gear set sharing a common ring gear with said first planetary gear set.

7. A robotic manipulator as claimed in claim 1 wherein said rotor motor comprises a stator surrounded by a rotary rotor bell, said stator being connected with a torque-proof connection to the center gear of said planetary gear set.

8. A robotic manipulator as claimed in claim 1 wherein said ring gear is a rotary rotor bell of said rotor motor.

9. A robotic manipulator as claimed in claim 1 wherein said ring gear comprises a radial, exterior supporting ring that overlaps said transmission.

10. A robotic manipulator as claimed in claim 1 wherein said rotor motor is an electronically commutated motor.

11. A robotic manipulator as claimed in claim 1 wherein said rotor motor is a disk motor.

12. A robotic manipulator as claimed in claim 1 wherein said position transmitter is located at a front side of said rotor motor opposite said transmission.

13. A robotic manipulator as claimed in claim 1 wherein said position transmitter comprises a flange that at least partially surrounds an exterior of said rotor motor.

14. A robotic manipulator as claimed in claim 1 wherein said position transmitter is selected from the group consisting of incremental rotary position transducers and Hall sensors.

* * * * *